United States Patent [19]

Kurtz

[11] 4,044,703
[45] Aug. 30, 1977

[54] SAILBOAT CONTROL APPARATUS

[76] Inventor: Joel Kurtz, Box 26, Damascus, Pa. 18415

[21] Appl. No.: 717,638

[22] Filed: Aug. 25, 1976

[51] Int. Cl.² .............................................. B63B 41/00
[52] U.S. Cl. ................................... 114/143; 114/133; 114/136; 114/140
[58] Field of Search ............................. 114/127–143, 114/124, 126, 91, 39

[56] References Cited

U.S. PATENT DOCUMENTS 61,049  1/1867  Chambers ........................... 114/135

FOREIGN PATENT DOCUMENTS 266,680  1/1964  Australia ............................. 114/126

Primary Examiner—Trygve M. Blix
Assistant Examiner—Sherman D. Basinger
Attorney, Agent, or Firm—Jack D. Slobod

[57] ABSTRACT

A sailboat pivotally carries a pair of weighted complementary shaped keels for independent rotation about a common longitudinally directed medial hinge axis for influencing the roll, moment of inertia and draft of the boat. The keels are independently supported at variable angles with respect to the vertical by lines directed upward along opposite sides of the boat. The upper ends of the lines are attached to a winch mechanism within the boat which includes one rotatable drum for varying the angle between the keels while maintaining the orientation of the angle bisector substantially constant and another rotatable drum for varying the orientation of the angle bisector while maintaining the angle between the keels substantially constant. A bolt carried slideably by the keels selectively locks the keels together for rotation as a unit. The bolt is remotely operated from within the boat via a controlling cable.

8 Claims, 10 Drawing Figures

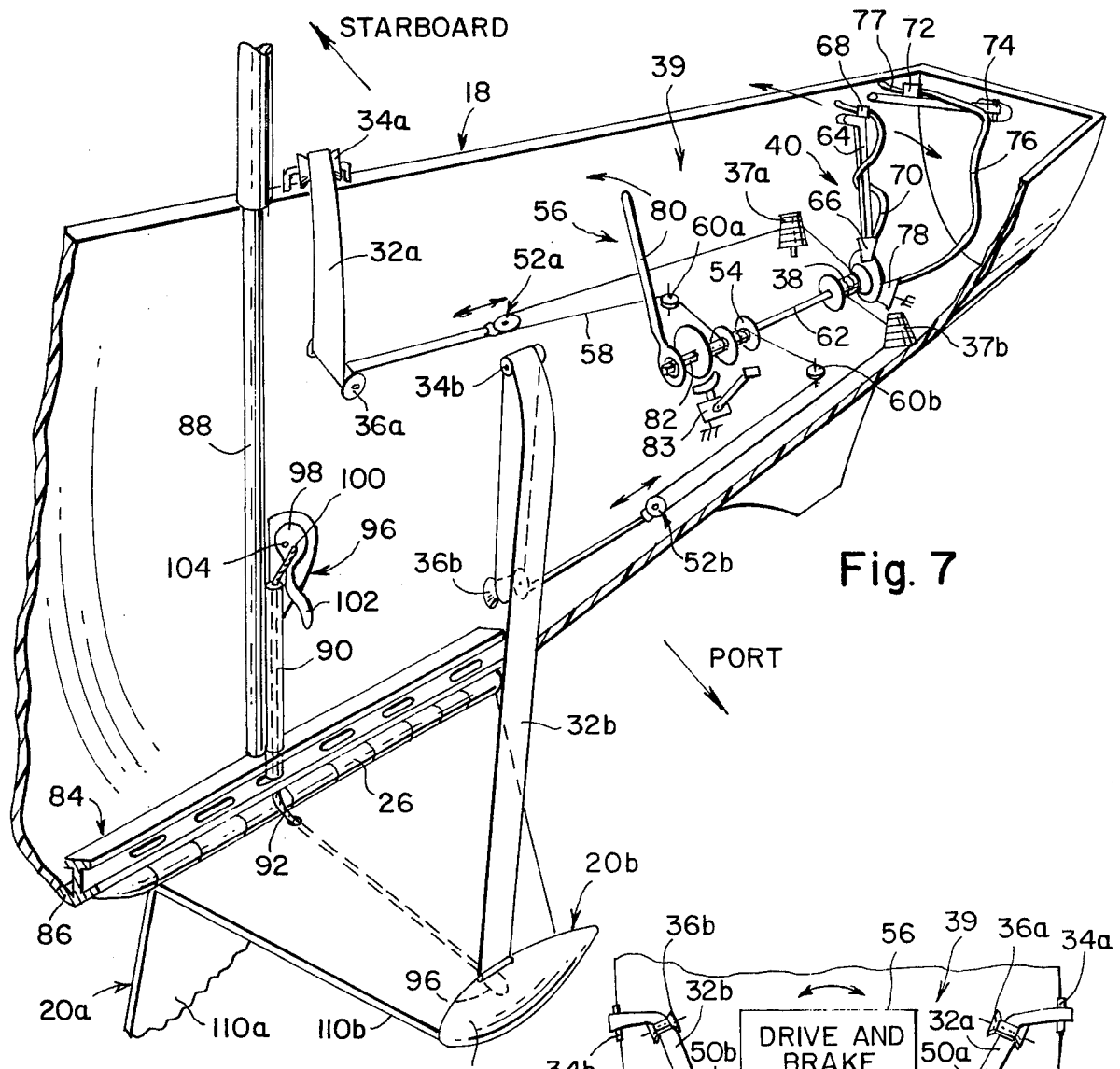
Fig. 7
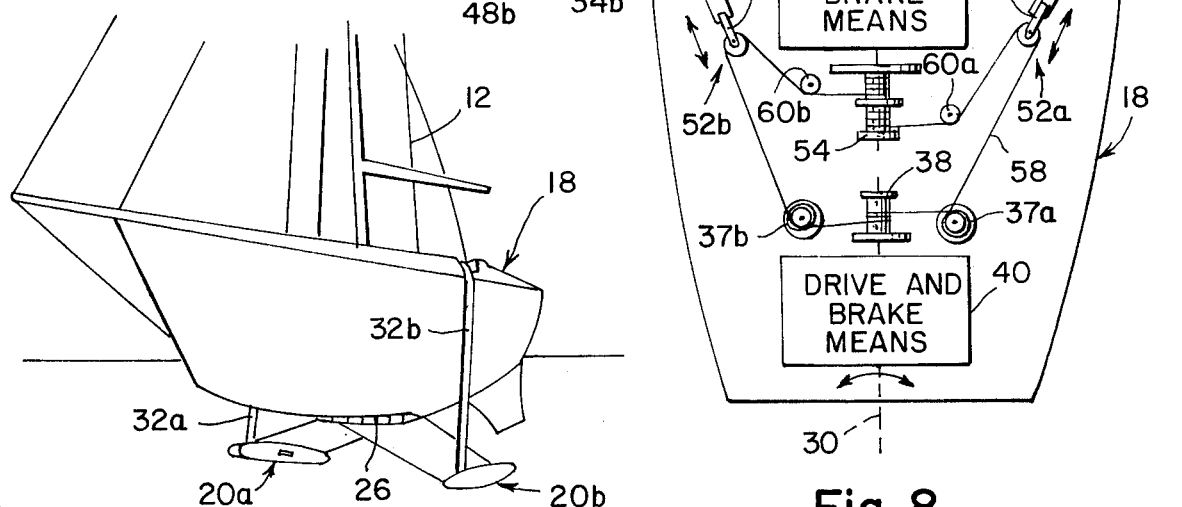
Fig. 6
Fig. 8

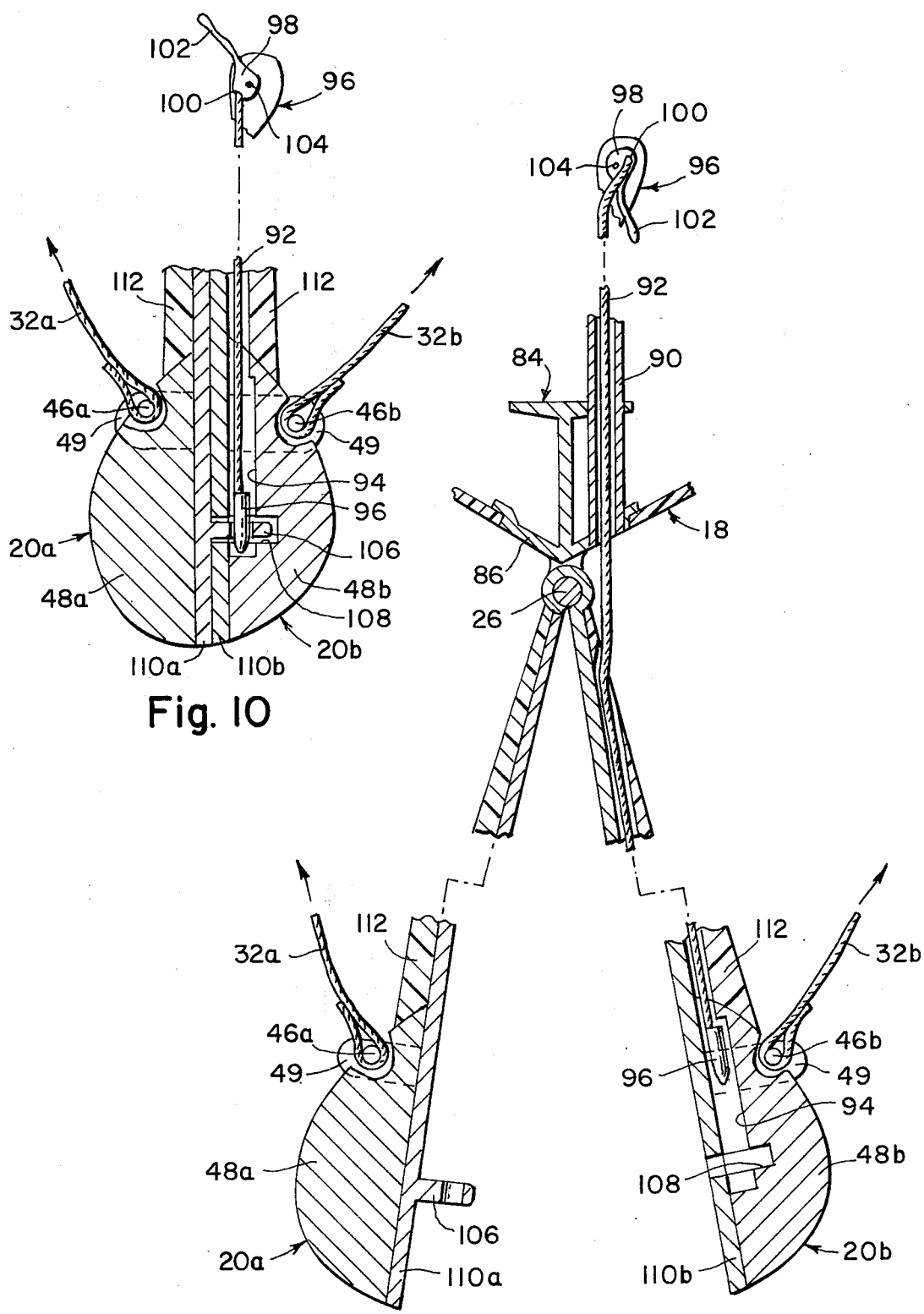

SAILBOAT CONTROL APPARATUS

FIELD OF THE INVENTION

The present invention relates generally to attitude control apparatus for boats. In its particular aspects, the present invention relates to a pivotally mounted weighted keel means which is positionable in a variable angular orientation in order that its weight exerts an attitude influencing torque. The present invention further relates to configuring the keel means as a pair of weighted keels which are independently angularly positionable for also influencing the moment of inertia and draft of the boat.

BACKGROUND OF THE INVENTION

A conventional sailboat, in order to reach a stable orientation, will generally heel or roll in response to the force of the wind caught by its sails. Consequently, the component of sail area available for forward thrust is considerably reduced. Further, the water pressure distribution acting on the sailboat hull varies as a function of the degree of heeling, as do stresses from the transfer of the wind forces from the sails to the deck and hull. Consequently, the sailboat deck and hull in particular are generally configured of a heavier nature than would be necessary if the sailboat were always generally vertically oriented. Therefore, the provision of attitude control means for maintaining the sailboat in a vertical orientation can provide the benefits of both a lighter weight hull and deck and the availablity of the full sail area oriented for producing forward thrust.

Most sailboats include a keel which is either fixedly mounted or generally vertically retractable.

DESCRIPTION OF THE PRIOR ART

The prior art has not heretofore recognized the possibility that a weighted keel be provided pivotally mounted and positionable in order that its weight exert an attitude influencing torque about the center of gravity of the boat. Neither does the prior art suggest the provision of a pair of weighted keels which rotate independently about a common axis.

Swiss Pat. No. 388,803 to Routchenko discloses a centerboard which includes two rotatable sections mounted about closely spaced axes. The two sections are always driven in a complementary fashion.

U.S. Pat. No. 3,179,078 to Popkin discloses a sailboat control including a pair of laterally spaced pivotted hydrofoils mounted on outriggers. The hydrofoils provide variable lifting forces for influencing the attitude of the boat.

Further, in the prior art, U.S. Pat. No. 995,078 to Mowbray discloses a retractable centerboard including pivotally mounted side wings.

OBJECTS OF THE INVENTION

It is an object of the present invention to provide pivotally mounted weighted keel apparatus for a boat which is positionable in a variable angular orientation with respect to the vertical in order that its weight exert a torque about the center of gravity of the boat for influencing the boat's attitude.

It is another object of the present invention to provide a pair of keels pivotally mounted to the underside of a boat for rotation about a common axis in combination with means for separately varying the angle between the keels and the orientation of the bisector of the angle.

It is yet another object of the present invention to support pivotally mounted weighted keels in a non-rigid manner in order to prevent the transmission of shock to the hull of the boat.

It is still another object of the present invention to provide a pair of weighted pivotally mounted keels with a remotely controllable means for selectively locking the keels together to pivot as a unit.

SUMMARY OF THE INVENTION

Briefly, the aforementioned and other objects of the present invention are satisfied by providing a pair of weighted keels which are pivotally mounted to a medial point on the underside of a boat for independent rotation about a longitudinally directed axis. Drive means for positioning the keels with a variable angle therebetween and a variable orientation of the angle bisector includes first and second flexible line means which are upwardly directed along the opposite external sides of the boat and are respectively secured at their lower ends to the keels for supporting the keels at selected angular orientations. It will be recognized that supporting the keels by flexible line means prevents upwardly directed forces acting on the keels, as from the ocean bottom, from being transmitted to the hull of the boat.

A takeup means within the boat is secured to the upper ends of the line means. The takeup means includes first and second longitudinally spaced apart drum means located within the boat proximate the transverse center of the boat. It further includes first and second pulleys positioned proximate and being generally moveable along opposite sides of the boat. The upper ends of the first and second line means are respectively secured to the bails of the first and second pulleys. A cable is wound about the first drum means at a region intermediate its ends. The opposite ends of the cable pass respectively about the first and second pulleys and then are wound about the second drum means in the same direction.

In response to rotation of the second drum means both pulleys are moved in the same direction for simultaneously either raising both or lowering both of the line means. Thus, rotation of the second drum means varies the angle between the keels while keeping the orientation of the angle bisector substantially constant.

In response to rotation of the first drum means, cable is transferred from one side of the boat to the other, thereby moving the pulleys in opposite directions. Consequently, one of the line means is lowered while the other is raised. Therefore, the angle between the keels remains substantially constant while the orientation of the angle bisector is varied.

While the keels are positioned independently as aforementioned, the weights or ballasts carried by the keels exert torques about the center of gravity of the boat for influencing or varying both the attitude or roll and moment of inertia about the longitudinal axis of the boat. In addition, the draft of the boat is varied simultaneously with the moment of inertia.

In applications where it is not desired to significantly vary the moment of inertia and draft of the boat, but to vary or control only the roll attitude, the keels are locked together for rotation as a unit. To this end, a bolt is slideably carried by one of the keels for coaction with an eye carried by the other keel. The bolt is remotely raised out of the eye or lowered into the eye by means of a controlling cable which terminates within the boat.

When the keels are operated locked together, only the first drum means is rotated and the keels are supported by the line means on the side of the boat to which the keels are pivoted. Because of the shape of the hull of the boat and the location of the axis of rotation of the keels, there is a non-linear relationship between the amount one line means should be raised and the amount the other should be lowered to avoid tensioning the line means on the opposite side of the boat from which the keels are pivotted to. This non-linear relationship can be easily determined graphically for any particular hull shape. In order to closely satisfy this relationship, it is necessary to wind the cable about first and second fusees on opposite sides of the first drum means. Since the effective diameter of the generally frusto-conical fusses varies as a function of their rotation angles, they enable the introduction of a quadratic factor in the relationship between rotation of the first drum means and the movement of the line means.

Other objects, features and advantages of the present invention will become apparent upon perusal of the following detailed description of the preferred embodiments of the present invention when taken in conjunction with the appended drawing.

BRIEF DESCRIPTION OF THE DRAWING

FIG. 6 is a pictorial elevation of a sailboat viewed from a position intermediate the side and front thereof as in FIG. 4;

FIG. 7 is a pictorial cutaway of the sailboat of FIG. 6 viewed from a position intermediate the top and side thereof illustrating the complete mechanism for operating the keels;

FIG. 8 is a schematic plan view of the boat in FIG. 7;

FIG. 9 is a fragmentary front cross-sectional elevational view of the keels when parted; and FIG. 10 is a fragmentary front cross-sectional view of the keels when locked together.

DETAILED DESCRIPTION OF THE PREFERRED EMBODIMENTS

Figure 1:
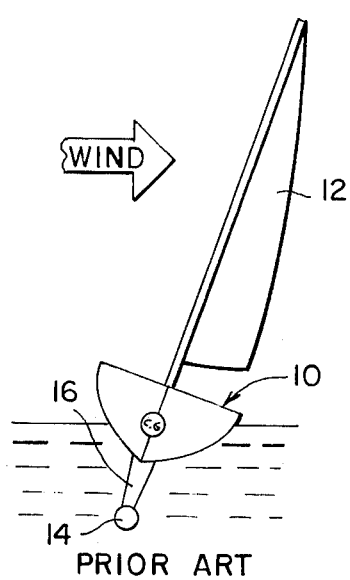
FIG. 1 is a front elevational view of a prior art sailboat in operation.

With reference to FIG. 1 of the drawing, in the prior art sailboat 10, the application of wind to the sails 12 causes the boat 10 to heel or roll and assume an inclined position with respect to vertical. In this inclined position, the usual weight or ballast 14 carried by the fixedly mounted keel 16 will exert a torque about the center of gravity (C.G.) of the boat to counteract the torque produced by the wind pressure on the sails. Consequently, the component of sail area available for horizontal thrust is reduced. Also, due to the rolling of boat 10, there is a variable distribution of stress in the deck and hull of the boat and a variable distribution of water pressure on the hull. These variable distributions require that the hull and deck be designed of a weight to carry these stresses under all possible roll inclinations.

Figure 2:
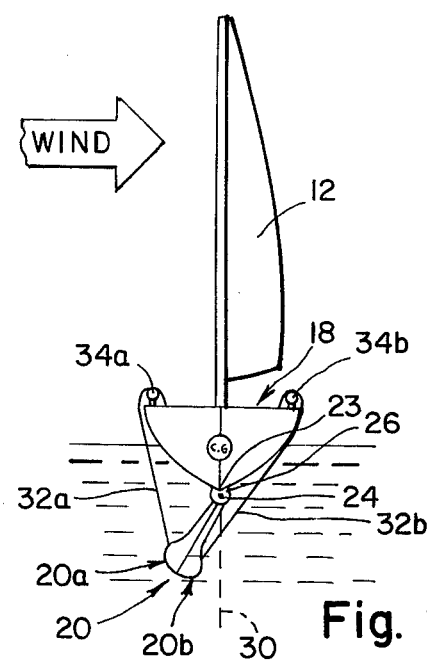
FIG. 2 is a front elevational view of a sailboat equipped with pivotally mounted keels according to the principles of the invention in operation with the keels locked together.
Figure 3:
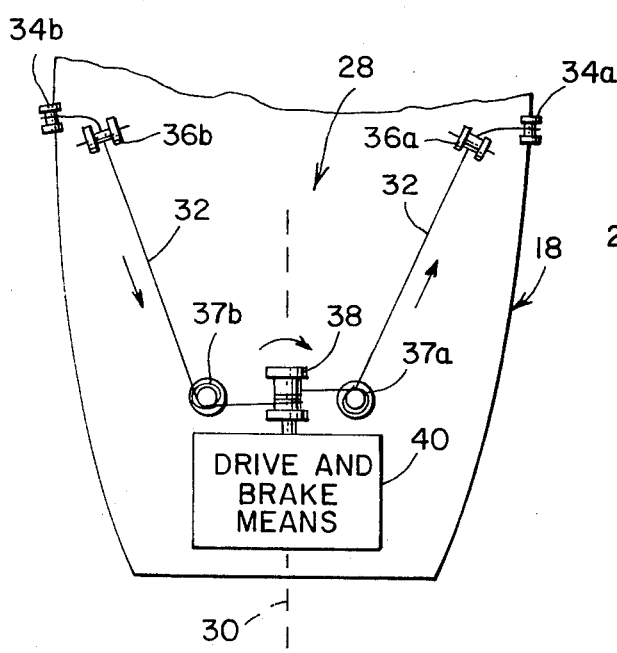
FIG. 3 is a simplified schematic plan view of the mechanism within the boat for operating the locked-together keels of FIG. 2.

According to the principles of the present invention, as illustrated in FIG. 2, in a sailboat 18, configured according to the present invention, a pair of complementary shaped weighted keels or keel sections 20a and 20b are provided pivotally mounted to the usual medial point 23 on the underside of the sailboat hull for rotation about a common longitudinally directed axis 24 established by a hinge 26. The keels 20a and 20b may be operated in a first mode, illustrated in FIG. 2, in which they are locked together for rotation as a unit by locking means which will be later described. Therefore, in regard to that mode, the keels 20a and 20b may be thought of as comprising a single pivotally mounted weighted keel means 20. In fact, they could be mechanized as one unit if only the first mode of operation were desired. FIG. 3 illustrates a simplified mechanism 28 within boat 18 for operating the keel means 20 in only the first mode of operation.

An important advantage of the invention, as illustrated in connection with the first mode, is that the keel means 20 may be driven to an inclined position with respect to the longitudinal and vertical medial plane 30 of boat 18 in a manner that its weight will exert a torque about the center of gravity of the boat to oppose the wind produced torque and maintain boat 18 oriented generally vertically. Consequently, the full sail area may be available for thrust and the stress distribution on the deck and hull is of a more predictable nature allowing a reduction in weight of the boat.

The means for driving the keel means 20 comprises, for the simplified mechanism of FIG. 3, an elongated flexible line means 32 which includes end sections 32a and 32b that are respectively secured to the lower portion of the keel means 20 on opposite sides of the keel means. The sections 32a and 32b are upwardly directed along opposite sides of boat 18 and are coupled to the mechanism 28 of FIG. 3, which essentially comprises a means for simultaneously raising one of the sections 32a and 32b and lowering the other of the sections.

In the mechanism 28, the upper ends of the sections 32a and 32b of line means 32 are respectively trained over longitudinally directed fixed rollers 34a and 34b carried by opposite sides of the upper portion of the hull. Within the boat, the line means 32 is trained from roller 34b and is folded rearward and inward by passing over an inclined fixed roller 36b. Thereafter, the line means is wound about a fusse 37b; then wound about a drum 38 located proximate the medial plane 30; then wound about a similar fusse 37a and directed forward and outward to another inclined fixed roller 36a and directed to roller 34a.

A means 40 for selectively drivingly rotating drum 38 in either direction is provided coupled thereto. Means 40 may be a motorized or manual arrangement as desired. In response to rotation of drum 38, the line means 32 is moved or transferred from one side of the boat 18 to the other for simultaneously raising one of the sections 32a or 32b and lowering the other in a manner to support the keel means 20 in a desired orientation. It should be recognized that in the position of the keel means illustrated in FIG. 2, the keel means is supported only by the line means section 32a on the side of the boat to which it is pivotted. Consequently, the line means section 32b should be somewhat slack to avoid a buildup of opposed forces in the line means sections 32a and 32b.

Because of the non-linear geometry involved, it is necessary that there be a non-linear relationship between rotation of the drum 38 and movement of the line means sections 32a and 32b. This non-linear relationship may be closely matched by appropriately configuring the pitch and taper of th fusees 37a and 37b. The fusees 37a and 37b are best illustrated in FIG. 7 and are well known non-linear elements each of which comprises a frusto-conical roller having a threaded spiral track on its exterior which guides the line means. In response to movement of an input position of the line means to the fusee, it will roate and the entire winding of line means thereon will move either upward or downward changing the length of line means stored in the winding. Thus, there is a non-linear relationship between the movements of the input and output portions of the line means thereon. This relationship can be tailored as desired to closely match the geometry involved in the first mode. Further, while the flexible line means may be cable, rope, strap or the like, I prefer a nylon woven strap to provide a measure of elasticity to further aid in satisfying this geometry.

Figure 4:
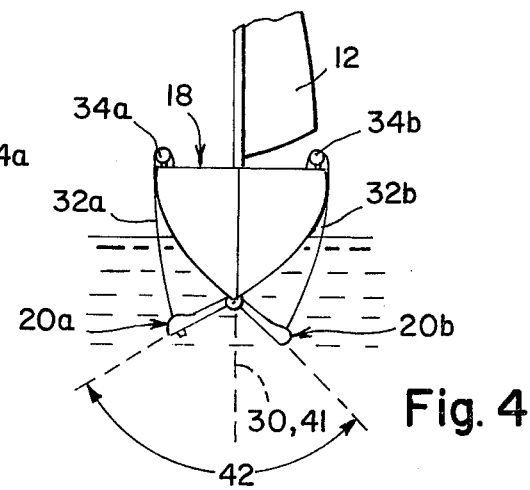
FIG. 4 is a front elevational view of the sailboat of FIG. 2, with the keels parted, showing one illustrative position of the keels.

In a second mode of operation, illustrated in FIG. 4–9, the keels 20a and 20b are parted and are respectively separately supported by line means sections 32a and 32b at inclined orientations with respect to the medial plane 30 and are operated by the takeup mechanism 39 illustrated in FIGS. 7 and 8. When the keels are symmetrically oppositely inclined, as illustrated in FIG. 4, the bisector 41 of the angle 42 between the keels is contained in vertical plane 30. Consequently, there is no torque produced for varying the roll attitutde of boat 18. There is, however, the effect of reducing the draft of boat 18 and also reducing the moment of inertia of boat 18 about its roll axis. The effects of the keel positions in FIGS. 2 and 4 can be simultaneously accomplished with the illustrative position of the keels 20a, 20b in FIG. 5. Therein, the keels are inclined at differently oppositely directed angles. In the present invention, as will be understood as the discussion proceeds, the mechanism 39 operates the keels 20a and 20b to a variable angle 42 between the keels and to a variable angle 44 between bisector 41 and the vertical plane.

The concept of mechanism 39 will be best understood by first referring to FIG. 8. It should be first noted that the line means sections 32a and 32b in the preferred embodiment comprises nylon straps which are upwardly directed along opposite external sides of boat 18 and are respectively secured at their lower ends about pins 46a and 46b (See FIGS. 9 and 10) carried in recesses in lead weights 48a, 48b and preferably shackled directly to the keels 20a, 20b by means of ears 49. The upper ends of the line means sections 32a and 32b pass respectively over the rollers 34a, 34b and are directed downward along the interior of the hull. The line means sections 32a and 32b are then folded rearward and inward respectively about inclined rollers 36a and 36b. Thereafter, the free ends of the line means 32a and 32b are respectively secured to the bails 50a, 50b of pulleys 52a, 52b. As will be understood as the discussion proceeds, the pulleys 52a and 52b are positioned proximate to, and are movable generally along, opposite sides of boat 18. The movement of pulleys 52a, 52b raises or lowers the line means 32a, 32b for positioning keels 20a, 20b.

Figure 5:
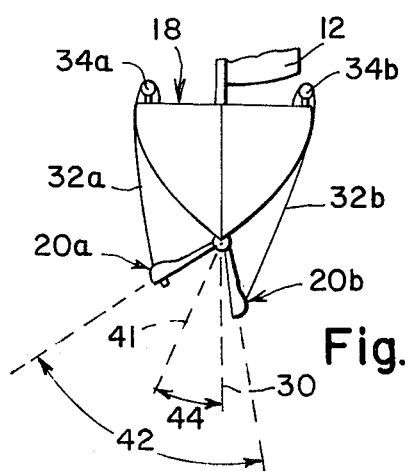
FIG. 5 is a view similar to FIG. 4, but showing another illustrative position of the keels.

In particular, with reference also to FIG. 5, the angle 42 between the keels is determined by rotation of a drum 54, while the angle 44 between the bisector 41 and medial plane 30 is determined by the rotation of drum 38 in a similar manner to the embodiment of FIG. 3. The drums 38 and 54 are located longitudinally spaced apart and are independently rotatable respectively by driving and braking means 40 and 56. These means may be either motorized or manual. A cable 58 is wound about drum 38 a region of the cable intermediate its length. Thereafter, the opposite ends of the cable 58 emanating from drum 38 are respectively wound about fusees 37a, 37b; then passed respectively about the rotating portions of pulleys 52a, 52b; folded inward respectively about fixed rollers 60a, 60b; and then wound about drum 54 in the same direction. It will be appreciated that the pulleys 52a, 52b respectively couple cable 58 to the upper ends of line means 32a and 32b.

Consequently, rotation of drum 54 in one direction will take up the opposite ends of cable 58, and thereby move the pulleys 52a, 52b rearward for increasing angle 42 between keels 20a, 20b. Rotation of drum 54 in the opposite direction will let out the ends of cable 58, whereby the weight of the keels will move the pulleys 52a, 52b rearward for decreasing angle 42.

Similar to the embodiment of FIG. 3, rotation of drum 38 will transfer a portion of cable 58 from one side to the other side of medial plane 30 for moving one of the pulleys 52a, or 52b forward and the other of the pulleys rearward for varying the angle 44 defining the inclination of bisector 41. It should now be understood that each of the drums 38 and 54 may be independently rotated for respectively controlling the angles 44 and 42. Consequently drums 38 and 54 comprise independently moveable control means and the cable 58 and pulleys 52a, 52b comprise a means for coupling each of these control means to each of the line means 32a, 32b.

In FIG. 7, the various drive and brake means 40 and 56 are illustrated in further detail in regard to a manual system. Further, for strength, the drums 38 and 54 are each mounted for independent rotation about a common longitudinally directed shaft 62.

The drive and brake means 40 includes a lever or arm 64 mounted for independent rotation about shaft 62. Lever 64 is selectively coupled to drum means 38 by a hydraulic clutch 66 which is actuated by a handgrip control 68 carried on the upper end of arm 64. The control 68 is coupled to clutch 66 by hydraulic line 70 and in response to squeezing of control 68, clutch 66 is pressurized via line 70, to couple the lever 64 to the drum means 38. By squeezing the control 68 during each angular stroke of lever 64 in the desired direction, a ratchet-type action is accomplished.

Further, a similar hydraulic control 72 is mounted on the usual tiller arm 74 and is coupled via line or conduit 76 to a hydraulic brake 78 for acting against the drum means 38. Control 72 is also of the handgrip type, but is preferably of the two-position type. Consequently, in one position of its actuating lever 77, it applies brake 78, while in its other position the brake 78 is not applied.

The drive and brake means 56 includes a ratchet wrench 80 acting in cooperation with a shaft 82 of polygonal cross-section that projects axially and fixedly from drum 54. Further, there is a hand or foot operated brake or drag member 83 for selectively acting against the drum 54.

Now, with reference to FIGS. 7, 9 and 10, the means preferred for selectively locking together the keels 20a and 20b will be explained. While this means is purely mechanical, it should be noted that hydraulic or electromechanical means may also be suitable. First, it should be understood, that for distributing stress resultant from the keels, a longitudinally directed beam 84 is provided along the transverse center of boat 18. Beam 84 includes a "V"-shaped bottom portion 86 which forms the center of the underside of the boat. The hinge 26 is preferably integrally suspended from beam 84. Further, the beam 84 supports the usual mast 88 and a tubular standpipe 90 that communicates with the underside of the boat.

A cable 92 runs within the standpipe 90 and within a downwardly directed channel 94 at keel 20b. A conically pointed tubular bolt 96 is carried slideably within channel 94 and is controlled by the bottom end of cable 92. A control 96 including a rotary member 98 is carried on the top of standpipe 90. The upper end of cable 92 is fastened to member 98 at a point 100. The rotary member includes an actuating handle 102 which is positionable in either an upwardly directed or downwardly directed position and the point 100 of attachment of cable 92 is located with respect to axis 104 of member 98 such that when the handle 102 is directed downward (FIGS. 7 and 9) the bolt is raised while when it is directed upward the bolt is lowered.

The keel 20a fixedly carries an eye 106 which is engagable within a seat 108 in keel 20b. When the bolt 96 is lowered and eye 106 is engaged in seat 108, the bolt passes through the eye to prevent separation of the two keels as illustrated in FIG. 10. The cable 92 preferably has a measure of stiffness in order that the bolt 96 is forced downward in response to upward movement of handle 102 for clearing debris from eye 106.

The keels 20a and 20b are respectively formed by a pair of elongated metal plates 110a and 110b that are hinged together at their upper ends at hinge 26. The lead weights 48a and 48b are respectively fixedly carried proximate the bottom ends of keels 20a and 20b. It will be recognized that the position of the weights 48a and 48b is such that they exert forces tending to drive the keels together into mating relationship in the absence of a pull on the line means 32a, 32b. For providing a hydrodynamic contour to the keels 20a and 20b, a filler of epoxy resin 112 is applied to the plates 110a, 110b tapering in thickness over the distance from the weights 48a, 48b to the common hinge 26. Alternatively, the filler may be eliminated, and the plates 110a, 110b provided to vary in thickness according to the same contour.

While the preferred embodiments of the present invention have been described herein in particular detail, it should be noted that numerous additions, omissions and modifications in detail are possible within the intended spirit and scope of the invention claimed herein.

I claim:

1. In a boat, attitude control apparatus comprising: first and second weighted keels pivotally mounted to a medial point on the underside of said boat for independent rotation about a common longitudinally directed axis; first and second flexible line means upwardly directed along opposite external sides of said boat; the lower ends of said first and second line means being connected respectively to said pair of keels for supporting said keels at variable angles with respect to the vertical; first and second independently moveable controls within said boat; and means within said boat coupling each of said first and second controls to the upper ends of each of said first and second line means for selectively taking up or letting out said first and second line means in response to movement of said first and second control means in a manner that movement of only said second control varies the angle between said keels but maintains the orientation of the bisector of said angle substantially constant and that movement of only said first control varies the angular orientation of said bisector while maintaining the angle between said keels substantially constant.

2. The apparatus of claim 1 wherein said first control means includes a first rotatable drum within said boat and said second control means includes a second rotatable drum within said boat and wherein said coupling means comprises: first and second moveable pulleys respectively positioned proximate opposite sides of said boat; said first and second pulleys having bails respectively secured to the upper ends of said first and second line means; a cable having first and second ends; said cable being wound about said first drum means at a region of said cable intermediate its ends; the first and second ends of said cable emanating outward from said first drum means and respectively passing about said first and second pulleys and then each of said first and second ends being wound about said second drum means in the same direction; whereby rotation of said second drum means in one direction takes up said first and second ends of said cable, thereby moving said first and second pulleys in generally the same direction for raising said first and second line means and increasing the angle between said keels while maintaining the orientation of said bisector substantially constant; and whereby rotation of said second drum means in the opposite direction decreases the angle between said keels; and whereby rotation of said first drum means transfers said cable from one side to the other side of said boat, thereby moving said pulleys in generally opposite directions for raising one of said line means and lowering the other of said line means, thereby rotating said bisector while maintaining the angle between said keels substantially constant.

3. In a boat, attitude control apparatus comprising: first and second weighted keels pivotally mounted to a medial point on the underside of said boat for independent rotation about a longitudinally directed axis; first and second flexible line means upwardly directed along opposite external sides of said boat; the lower ends of said first and second line means being connected respectively to said pair of keels for supporting said keels at variable angles with respect to the vertical; takeup means within said boat coupled to the upper ends of said first and second line means for positioning said keels with a variable angle between keels and a variable orientation of the bisector of said angle with respect to the vertical, the weights of said keels exerting torques about the center of gravity of said boat for influencing both the attitude and moment of inertia of said boat; means carried by said keels for locking said keels together for rotation as a unit; and control means within said boat coupled to said locking means for remote operation thereof.

4. The apparatus of claim 3 wherein said locking means includes an eye carried fixedly by one of said keels and a bolt carried slideably by the other of said keels, said bolt being positioned for sliding generally vertically downward into said eye when said keels abut each other; and upwardly directed cable secured to said bolt at the lower end of said cable; the upper end of said cable being coupled to control means; said control means being configured for selectively raising or lowering said bolt into or out of said eye.

5. The apparatus of claim 3 wherein said takeup means includes a drum means within said boat positioned proximate the transverse center of said boat; means for rotating said drum means; cable means wound about said drum means at a region intermediate the length of said cable means, first and second fusee means; a first end of said cable means emanating from said drum means being wound about said first fusee means and being coupled to the upper end of said first line means; a second end of said cable means emanating from said drum means being wound about said second fusee means and then coupled to the upper end of said second line means; the rotation of said drum means causing transfer of said cable means from one side to the other side of said boat thereby raising one of said line means and lowering of the other of said line means for rotating both of said keels in the same direction; said first and second fusee means being configured for substantially preventing a buildup of opposed forces in said first and second line means when said keels are locked together.

6. In a boat, attitude control apparatus comprising: a keel means pivotally suspended from a point on the underside of said boat for rotation about a longitudinally directed axis; first and second flexible line means upwardly directed along opposite external sides of said boat; the lower ends of said first and second line means being connected to opposite sides of said keel means for supporting said keel means at a variable angle with respect to the vertical; a drum means within said boat; means for selectively rotating said drum means; a cable means having first and second ends; said cable means being wound about said drum means at a region of said cable means intermediate its ends; said cable means being coupled respectively to the upper ends of said first and second line means respectively at first and second spaced apart locations along said cable means on opposite sides of said drum means; whereby rotation of said drum means transfers said cable means from one side of said boat to the other thereby raising one of said line means and lowering the other of said line means; and non-linear means about which said cable means is wound for varying the relative rates of raising said one line means and lowering said other of said line means in relation to the instantaneous angular orientation of said keel means for substantially preventing a buildup of opposed forces in said first and second line means.

7. The apparatus of claim 6 wherein said non-linear means comprises first and second fusee means about which said cable means is wound in passing from said drum means respectively to the upper ends of said first and second line means.

8. The apparatus of claim 6 wherein said keel means comprises first and second keels pivotally suspended from said point for independent rotation about said axis; the lower ends of said first and second line means being respectively attached to said first and second keels; the aforementioned drum means being a first drum means; a second drum means within said boat about which the ends of said cable means are wound in the same direction; the angle between said keels being variable in response to rotation of said second drum means and the orientation of the bisector of said angle being variable in response to rotation of said first drum means.

* * * * *